United States Patent [19]

Wagener et al.

[11] Patent Number: 5,505,851
[45] Date of Patent: Apr. 9, 1996

[54] SEMIPERMEABLE MEMBRANES OF HOMOGENEOUSLY MISCIBLE POLYMER ALLOYS

[75] Inventors: Reinhard Wagener, Flörsheim am Main; Freddy Helmer-Metzmann, Mainz; Otto Herrmann-Schönherr, Bensheim, all of Germany

[73] Assignee: Hoechst Aktiengesellschaft, Frankfurt, Germany

[21] Appl. No.: 173,997

[22] Filed: Dec. 28, 1993

[30] Foreign Application Priority Data

Dec. 30, 1992 [DE] Germany ............................ 42 44 475.6

[51] Int. Cl.$^6$ ............................. B01D 69/08; B01D 71/56
[52] U.S. Cl. .................................. 210/490; 96/13; 96/14; 210/500.23; 210/500.38; 264/41; 525/420
[58] Field of Search ................................ 210/490, 500.23, 210/500.37, 500.38, 500.39, 645, 646, 321.87, 500.33; 96/10, 13, 14; 264/41; 528/125, 126, 128, 174, 310, 321, 331, 340; 525/420

[56] References Cited

U.S. PATENT DOCUMENTS

| | | | |
|---|---|---|---|
| 4,268,650 | 5/1981 | Rose | 528/128 |
| 4,273,903 | 6/1981 | Rose | 528/174 |
| 4,320,224 | 3/1982 | Rose et al. | 528/125 |
| 4,720,343 | 1/1988 | Walch et al. | 210/500.38 |
| 4,935,141 | 6/1990 | Buck et al. | 210/500.38 |
| 4,987,216 | 1/1991 | Keil et al. | 528/331 |
| 5,128,440 | 7/1992 | Keil et al. | 528/321 |
| 5,145,583 | 9/1992 | Angleraud et al. | 210/646 |
| 5,151,193 | 9/1992 | Grobe et al. | 210/651 |
| 5,152,894 | 10/1992 | Haubs et al. | 210/500.38 |
| 5,247,017 | 9/1993 | Noma | 525/420 |
| 5,308,489 | 5/1994 | Dhein et al. | 210/500.38 |

FOREIGN PATENT DOCUMENTS

| | | | |
|---|---|---|---|
| 0337626 | 10/1989 | European Pat. Off. . | |
| 0382009 | 8/1990 | European Pat. Off. . | |
| 2704600 | 8/1978 | Germany | 210/500.38 |
| 2039637 | 2/1987 | Japan | 210/500.37 |
| WO90/09232 | 8/1990 | WIPO . | |

*Primary Examiner*—Joseph W. Drodge
*Attorney, Agent, or Firm*—Curtis, Morris & Safford

[57] ABSTRACT

Semipermeable membranes of homogeneously miscible polymer alloys and a process for their preparation. In particular, semipermeable membranes of homogeneous polymer alloys which contain sulfonated, aromatic polyether ketones and at least one polyamide as the main constituents, wherein the polyamide is a completely aromatic polyamide.

36 Claims, No Drawings

SEMIPERMEABLE MEMBRANES OF HOMOGENEOUSLY MISCIBLE POLYMER ALLOYS

DESCRIPTION

The invention relates to semipermeable membranes of homogeneously miscible polymer alloys and a process for their preparation.

Since the introduction of asymmetric membranes of cellulose acetate by Loeb and Sourirajan (S. Sourirajan, Reverse Osmosis, Logos Press, London 1970) and of hydrophobic polymers (US-A 3 615 02), numerous membranes have been developed and proposed, in particular for separations of low molecular weight and macromolecular constituents dissolved in water, the structure and suitability of which have been described in the literature (Desalination, volume 35, 5 to 20, (1980)) and which have also been successfully tried out in industrial practice or for medical purposes.

Many of the membranes described have particularly advantageous properties for achieving specific tasks. Because of their chemical build-up and their construction, the individual membranes are in each case of optimum suitability only for quite specific separation problems. This results in the fundamental object of constantly developing novel membranes.

An overview of the advantages and disadvantages of the membranes already known is given in EP-A-0 082 433. Thus, for example, there are hydrophilic, asymmetric membranes of cellulose acetate which have satisfactory antiadsorptive properties but leave very much to be desired in respect of their thermal and chemical resistance. Although membranes of polysulfones or similar polymers have a good thermal and chemical resistance, such membranes have a marked tendency to adsorb dissolved substances because of the hydrophobic properties of the polymers employed, which means that the membrane becomes virtually blocked. The mixtures of polysulfone and polyvinylpyrrolidone described in EP-A-0 082 433 indeed eliminate the disadvantage caused by the hydrophobicity of the polysulfone, but these mixtures are sensitive toward the action of organic solvents. Hydrophilicity and simultaneously resistance to solvents are certainly found in membranes of regenerated cellulose. However, these membranes can be hydrolyzed relatively easily in acid or alkaline media. Moreover, they are readily attacked by microorganisms.

In the case of membranes which are built up from polymer mixtures which do not form homogeneously miscible alloys, one or more components of the alloy can be dissolved out on contact with a solvent, which means that the properties of the membrane can change significantly. To eliminate this serious disadvantage, it is thus necessary to prepare homogeneously miscible alloys.

Although the principle of alloying polymers to prepare novel materials such as can be realized only with difficulty, if at all, in another manner, for example by copolymerization, is widely known, the ability to predict the properties of an alloy from the properties of the individual components is currently still a long way off. Alloying of polymers therefore still remains largely empirical (Olabisi, Robeson, Shaw: Polymer-Polymer-Miscibility, Academic Press, N.Y. 1979, pages 321 to 327). In particular, the homogeneous miscibility or compatibility of alloys, especially of those of highly interactive polymers, cannot be predicted in spite of a very large number of experimental and theoretical studies in this field (Journal of Polymer Science, Polymer Physics Edition, volume 21, page 11 (1983)). Complete miscibility is thus an unusual property in polymer mixtures, which normally tends to form multiphase systems (Polymer, volume 24, page 60 (1983)). Even modern thermodynamic theories have up to this point in time had only limited success regarding prediction of miscibility. It has therefore been doubted that any practical theory can be developed which takes into account the real complexities given to polymer-polymer interactions by nature (Macromolecules, volume 16, page 753 (1983)).

Membranes of a homogeneously miscible polymer alloy which comprises aromatic polyamides and poly-N-vinylpyrrolidone are described in the application EP-A-0 382 009. However, the hydrophilicity of these membranes can be improved even further, for example by introducing charged groups into the membrane-forming polymer alloy. Membranes of a polymer alloy which are composed of a partly aromatic polyamide (®Trogamid T) and a sulfonated polyether ketone are described in the withdrawn European Patent Application EP-A-0 337 626. However, the chemical stability of these membranes toward moderately polar organic solvents is already very unsatisfactory.

The invention is based on the object of providing semipermeable membranes which have pronounced hydrophilic properties, i.e. are capable of absorbing considerable amounts of water, with respect to their total weight, are resistant to hydrolyzing agents and to the action of heat, withstand organic solvents better than membranes of hydrophobic polymers, display a low protein adsorption, have a good wettability and are also not susceptible to the action of microorganisms.

This object is achieved by providing a membrane which is built up from a homogeneous polymer alloy which comprises as the main constituents sulfonated, aromatic polyether ketones and at least one polyamide and in which the polyamide is a completely aromatic polyamide. A completely aromatic polyamide is derived formally from an aromatic dicarboxylic acid and an aromatic diamine. The membrane according to the invention can also be composed of a homogeneous polymer alloy which, in addition to sulfonated, aromatic polyether ketone and completely aromatic polyamide, also comprises other polymers to a lesser extent. The alloys from which the membranes according to the invention could be built up are preferably free from partly aliphatic polyamides according to EP-A-337 626.

According to one embodiment of the invention, the membrane is composed of a polymer alloy which comprises at least one sulfonated, aromatic polyether ketone and at least one completely aromatic polyamide. In addition to the sulfonated, aromatic polyether ketone and the completely aromatic polyamide, smaller amounts of poly-N-vinyl-2-pyrrolidone can also be present—according to one embodiment of the invention. The polymer alloy of the membrane according to the invention can also comprise a copolymer which is built up from the monomers N-vinyl-2-pyrrolidone and vinyl acetate, in addition to the poly-N-vinyl-2-pyrrolidone. According to another embodiment of the invention, in addition to the sulfonated, aromatic polyether ketone and the completely aromatic polyamide, a copolymer of N-vinyl-2-pyrrolidone and vinyl acetate (but no poly-N-vinyl-2-pyrrolidone) is also present in the polymer alloy of the membrane according to the invention.

If the polymer alloy of the membrane according to the invention comprises a sulfonated, aromatic polyether ketone and a completely aromatic polyamide, each of the two constituents is present in an amount of 1 to 99% by weight.

In particular, the alloys comprise 5 to 60, preferably 15 to 50%, by weight of a sulfonated, aromatic polyether ketone and 30 to 90, preferably 40 to 75%, by weight of an aromatic polyamide.

If the polymer alloy also comprises poly-N-vinyl-2-pyrrolidone and/or a copolymer of N-vinyl-2-pyrrolidone and vinyl acetate, it is advantageous if the content of sulfonated, aromatic polyether ketone is 5 to 60% by weight and the content of the completely aromatic polyamide is 20 to 90% by weight. Preferably, the content of polyvinylpyrrolidone and/or a copolymer of N-vinyl-2-pyrrolidone and vinyl acetate is 0.1 to 30% by weight.

It is advantageous if the sulfonated, aromatic polyether ketones are built up from recurring units of the formula

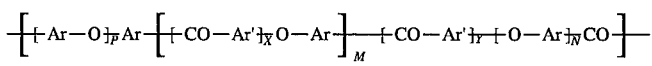

(1)

in which

Ar is a phenylene ring with para and/or meta bonds,

Ar'— is a phenylene, naphthylene, biphenylene or anthrylene unit or another divalent aromatic unit, X, M and N independently of one another are zero or 1, Y is zero, 1, 2 or 3, and p is 1, 2, 3 or 4, and in which, in the formula I, 20 to 100% of the O-phenylene-O units are substituted by an SO$_3$H group. Preferably, in the formula I, the indices p, X and M are coordinated with one another such that $p = 2 - (1-X) \cdot M$.

Sulfonated polyether ketones which are preferably employed are those of the formula II

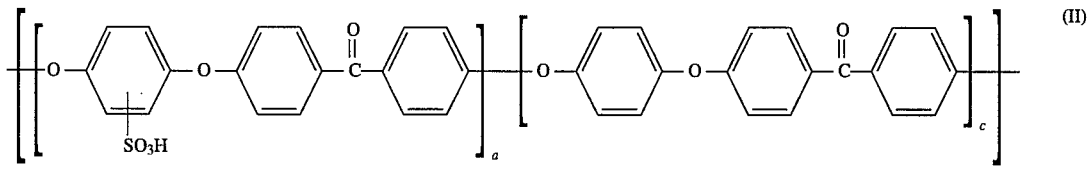

(II)

in which a is a number from 0.2 to 1, c is a number from 0 to 0.8 and the sum of a+c=1, of the formula III

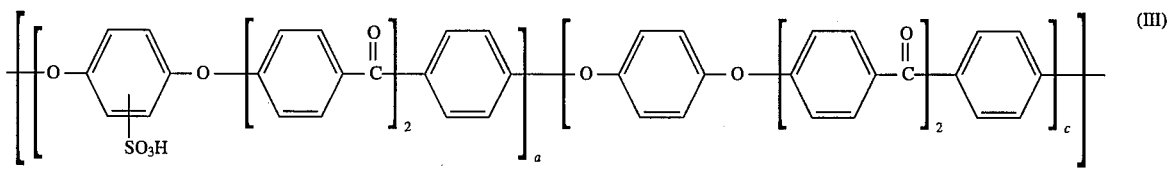

(III)

in which a is a number from 0.2 to 1, c is a number from 0 to 0.8 and the sum of a+c=1, and of the formula IV

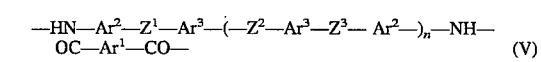

(IV)

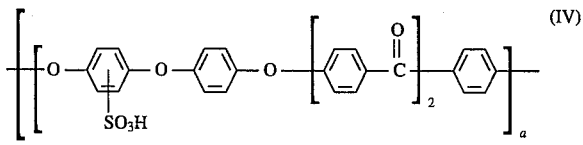

in which a is a number from 0 to 1, b is a number from 0 to 1, c is a number from 0 to 0.5 and the sum of a+b+c=1.

Sulfonated polyether ketones which are composed of at least two different recurring units of the formulae II, III and IV furthermore can also be employed. They can be prepared by copolymerization of units of the formulae II, III and IV (but which are free from sulfonic acid groups) and subsequent sulfonation of the copolymer obtained.

The sulfonated polyether ketones employed preferably have molecular weights, stated as the weight-average, in the range from 10,000 to 60,000 g/mol, in particular in the range from 20,000 to 30,000 g/mol.

Sulfonated polyether ketones can be prepared by a customary sulfonation process (for example EP-A0-008 895 and EP-A0-041 780). Preferably, sulfonation is carried out by the process described in German Patent Application P 4 219 077.0, to which reference is expressly made here.

The membrane according to the invention can be built up from a polymer alloy which comprises, as the completely aromatic copolyamide, preferably at least one which has structural units of the formula (V)

—HN—Ar$^2$—Z$^1$—Ar$^3$—(—Z$^2$—Ar$^3$—Z$^3$—Ar$^2$—)$_n$—NH—
OC—Ar$^1$—CO—     (V)

in which

—Ar$^1$— is a 1,4-phenylene radical or another divalent (C$_6$–C$_{12}$)-aromatic or -heteroaromatic radical optionally containing sulfonic acid groups or ether bridges, which is optionally substituted by one or two branched or unbranched C$_1$–C$_4$-alkyl or -alkoxy radicals or by one or more halogen atoms, for example chlorine, fluorine or bromine, —Ar$^2$— and —Ar$^3$— are identical or different 1,2-phenylene, 1,3-phenylene or 1,4-phenylene radicals, which are optionally substituted by one or two branched or unbranched $C_1$-$C_4$-alkyl or -alkoxy radicals or by one or more halogen atoms, for example chlorine, fluorine or bromine, —$Z^1$—, —$Z^2$— and —$Z^3$— independently of one another are a direct bond or one of the following divalent radicals: —O—, —C($CH_3$)$_2$—, —C($CF_3$)$_2$—, —$SO_2$— or —O—$Ar^2$—O—, in which —$Ar^2$— has the abovementioned meaning, and n is an integer, in particular n=0, 1 or 2.

Preferred copolyamides are those of the formula V which contain the structural unit (A) —OC—$Ar^1$—CO—, and three different structural units of the formulae (B) —NH—$Ar^2$—NH— and (D) —HN—$Ar^2$—$Z^1$—$Ar^3$—(—$Z^2$—$Ar^3$—$Z^3$—$Ar^2$—)$_n$—NH— wherein in each case at least one structural unit B and D should be present and $Ar^2$ in B and D can have different meanings. Preferably n is 0.

Examples of the unit —$Ar^1$— in the recurring units A are

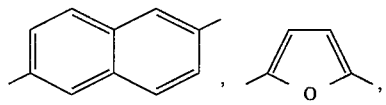

in particular

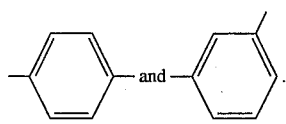

Examples of —$Ar^2$— in the recurring units B are substituted or unsubstituted p-phenylene units, such as, for example,

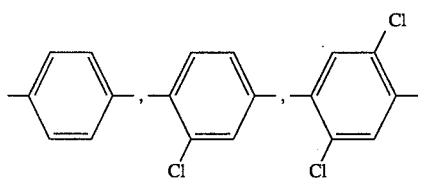

or

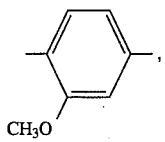

and substituted or unsubstituted m-phenylene units, such as, for example,

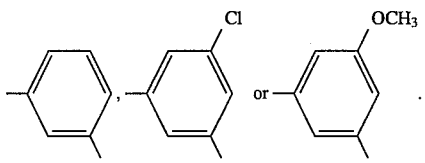

Examples of $Ar^2$—$Z^1$—$Ar^3$ in the recurring units D are:

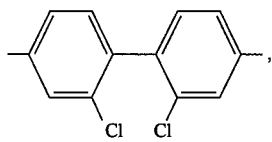

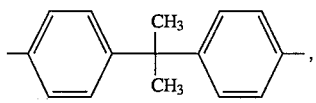

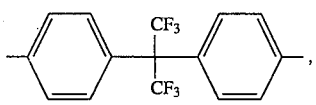

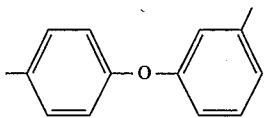

and

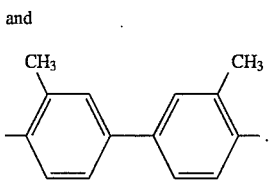

The following are particularly preferred:

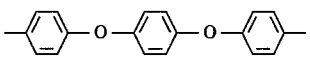

and

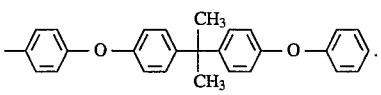

Preferably, the structural units A, B and D are present in the completely aromatic copolyamide in molar ratios of B/A=0.3–0.9 and D/A=0.1–0.7, and the molar ratio of (B+D)/A is 0.9 to 1.1.

The diamines B', B", D' and D", which are required for the structural units (B) and (D), employed in the synthesis of the completely aromatic copolyamides having the structural units A, B and D are usually employed in the following concentrations:

Diamine (B'): 0 to 50 mol %

Second diamine (B"): 0 to 60 tool %

Dieunines (D', D"): 10 to 70 mol % (per diamine unit (D') or (D")), based on 100 mol % of the acid component (A') employed, the molar ratio of the diamine components to the acid component being 0.90:1.10 to 1.10:0.90, preferably 1:1.

The copolyamides mentioned here can be prepared by solution condensation of the aromatic di-acid chlorides with the mixtures of the aromatic diamines, analogously to the processes described in European Patent Specifications EP-A-0 199 090, EP-A-0 322 837 and EP-A-0 445 673 and in German Patent Applications P 41 04 394, P 41 21 801 and P 42 02 16 5.0, in aprotic, polar solvents of the amide type, such as, for example, in N,N-dimethylacetamide or, in particular, in N-methyl-2-pyrrolidone. If appropriate, halide salts of the first and second group of the Periodic Table can be added to these solvents in a known manner in order to increase the dissolving capacity or to stabilize the polyamide solutions. Preferred additions are calcium chloride and/or lithium chloride.

The intrinsic viscosity, which is a measure of the average chain length of the polymers formed, of the copolyamides used as alloy components is preferably between 50 and 1000 cm$^3$/g, preferably between 100 and 500 cm$^3$/g, particularly preferably between 150 and 350 cm$^3$/g. It was determined on solutions of in each case 0.5 g of polymer in 100 ml of 96% strength sulfuric acid at 25° C.

The molecular weights of the polyvinylpyrrolidone (=PVP) and the copolyvinylpyrrolidone/polyvinyl acetate (abbreviated to: CoPVPAc), the other possible components of the homogeneous polymer alloys according to the invention, are, stated as the weight-average, usually 1000 to 3 million, preferably 20,000 to 200,000, in particular 40,000 to 100,000.

The homogeneous polymer alloys of the membranes according to the invention can be prepared from a common solution, which contains at least one polyether ketone or at least one sulfonated polyether ketone, at least one polyaramide and polyvinylpyrrolidone and/or CoPVPAc, in an aprotic organic solvent, for example dimethylformamide, dimethyl sulfoxide, N-methylpyrrolidone or N,N-dimethylacetamide. For this, for example, the polyaramide can be subjected to polycondensation in the corresponding solvent, the sulfonated polyether ketone (and if appropriate polyvinyl-pyrrolidone and/or CoPVPAc) can be dissolved in a suitable concentration, and a mixture of the particular polymer solutions in the calculated ratio of amounts can then be prepared.

If appropriate, halide salts of the first and second group of the Periodic Table can be added to these solvents in a known manner in order to increase the solubility or to stabilize the polyamide solutions. The process for the preparation of the homogeneous polymer alloys of the membranes according to the invention is described in more detail in the German Patent Application of the same priority "Polymer alloys based on sulfonated, aromatic polyether ketones", which is expressly referred to here.

Alternatively, the sulfonated polyether ketone (and if appropriate polyvinylpyrrolidone and/or CoPVPAc) can be added in dry form directly to the polyaramide solution after the polycondensation reaction has ended.

Polycondensation of the polyaramide in the presence of polyvinylpyrrolidone or CoPVPAc and subsequent addition of the sulfonated polyether ketone in solution or in dry form is preferred for the preparation of the ternary alloy.

Polycondensation of the polyaramide in the presence of polyvinylpyrrolidone and CoPVPAc and subsequent addition of the sulfonated polyether ketone in solution or in dry form is preferred in respect of the preparation of the quaternary alloy.

A process in which the polycondensation for the preparation of the polyaramide is carried out in the presence of the sulfonated polyether ketone and if appropriate in the presence of polyvinylpyrrolidone and/or CoPVPAc is particularly preferred.

To prepare the membranes according to the invention from the alloys, the solution of the alloy already described is filtered and degassed. An asymmetric membrane is prepared in a known manner by the phase inversion process (Robert E. Kesting, "Synthetic Polymeric Membranes", 2nd Edition, 1985, page 237 et seq.). For this purpose, the polymer solution is spread out as a liquid layer on a substrate which is as flat as possible. The flat substrate can be, for example, a glass plate or a metal drum.

Thereafter, precipitating liquid which is miscible with the solvent of the solution but in which the polymers dissolved in the polymer solution are precipitated as a membrane is allowed to act on the liquid layer. The alloy solvents comprise, for example, N,N-dimethylacetamide, N,N-dimethylformamide, dimethyl sulfoxide or, in particular, N-methyl-2-pyrrolidone as the main constituent. Highly volatile substances, such as, for example, tetrahydrofuran, acetone or methylene chloride, are possible as other constituents of the solvent.

Possible precipitating liquids are water and mono- or polyhydric alcohols, such as methanol, ethanol, isopropanol, ethylene glycol or glycerol, and moreover mixtures of these substances with one another or with aprotic, polar solvents, such as N,N-dimethylformamide, N,N-dimethylacetamide or dimethyl sulfoxide, or, in particular, with N-methyl-2-pyrrolidone. By the action of the precipitating liquid on the liquid layer of polymer solution, the dissolved polymer alloy is precipitated to form a macroporous membrane having an asymmetric pore structure. When carrying out the process, the precipitating liquid is advantageously allowed to act on the precipitated membrane until more than 99% by weight of the original solvent present in the freshly precipitated membrane is replaced by precipitating liquid. Thereafter, the membrane formed is freed from the precipitating liquid, for example by drying the membrane directly in a stream of air having a relatively atmospheric humidity in the range from 20 to 100%, or first treating it with a plasticizer, such as glycerol, and then drying it. If the precipitated membrane is impregnated with glycerol, it can preferably contain in the range from 5 to 60% of glycerol, based on its total weight; the membrane impregnated in this manner is dried, for example at a temperature in the range from 30° to 80° C.

The separation efficiency or the retention capacity of the membranes according to the invention can be varied in a controlled manner by subsequent treatment of the freshly precipitated membrane, at a temperature in the range from 60° to 120° C., with a liquid, for example water or mono- or polyhydric alcohols, or with the polar aprotic or polar protic solvents already mentioned, for example those of the amide type, or mixtures of these liquids with one another, or by treatment with optionally superheated steam (>100° C.).

To prepare membranes which are located on a carrier layer which is permeable to media which are capable of flow, the procedure is as above, but a nonwoven, for example of plastic or paper, is used as the substrate for formation of the membrane layer as a carrier for this layer, and after the membrane layer has formed, this layer is left on a substrate. However, the membrane can also first be prepared without a carrier and only then applied to a permeable carrier. The thickness of the membranes according to the invention without a carrier layer is in the range from 10 to 300 µm, in particular in the range from 20 to 120 µm.

Hollow fibers or capillaries can also be prepared in a known manner from the solution of the alloys, by spinning the solution of the polymer alloy through a correspondingly constructed, shaping annular or hollow needle die into precipitating liquid in accordance with the prior art. The wall thickness of such capillaries or hollow fibers is in the range from 20 to 500 µm, but in particular between 150 and 350 µm.

The membrane according to the invention is also suitable for the standard uses of porous membranes known to the expert, such as pressure filtration (micro-, ultra- and nanofiltration), diafiltration and dialysis, and also as a carrier membrane for permselective layers which are produced directly on or in the membrane. Thus, for example, "ultrathin" layers (≦1 µm) of polymers with functional groups (for example silicones, cellulose ethers or fluorine copolymers) can be spread on water, applied from there to the membrane surface and fixed covalently, for example by reaction with a diisocyanate, in order thus to achieve a higher permselectivity. The membranes according to the invention are also suitable analogously as carriers of reactive molecules, for example for fixing enzymes or anticoagulants, such as heparin, in accordance with the prior art.

The invention is illustrated in more detail by the following examples.

EXAMPLES

Example 1

For preparation of the membrane, a copolyamide was prepared from (A') 100 mol % of terephthalic acid dichloride (B') 25 mol % of paraphenylenediamine (D') 50 mol % of 3,3'-dimethyl-4,4'-diaminobiphenyl (D") 25 mol % of 1,4-bis(4-aminophenoxy)benzene at a temperature of 70° C. in N-methyl-2-pyrrolidone (NMP) as the solvent. The concentration of the solution was 6 (parts by weight per 100 parts by weight of the solution). A sulfonated polyether ketone of the formula:

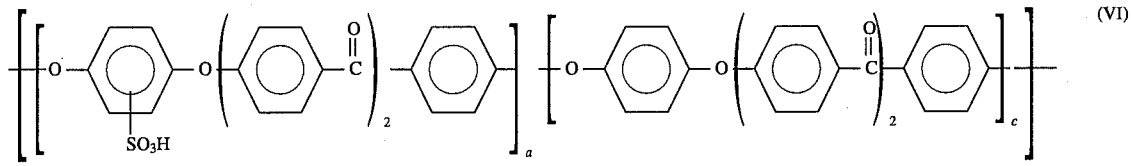

was prepared as the second alloy component by sulfonation in $SO_3$-containing concentrated sulfuric acid. The traction conditions were chosen such that $c=0.28$ and $a=0.72$, i.e. the ion exchange capacity of the sulfonated polymer was 1.4 to 1.6 meq/g.

Three grams of the precipitated and dried sulfonated polyether ketone were stirred into 100 g of the polyamide solution described above, until a clear, homogeneous solution of the polymer alloy was formed.

This solution was applied in a layer thickness of 200 μm to a polypropylene nonwoven carrier and was coagulated in water at 20° C.

The hydraulic permeability (ultrafiltration) and the retention capacity of the membrane with respect to dissolved macromolecules were determined under pressures of 3.0 bar at 20° C. in a stirred cylindrical cell (500 revolutions/minute, 250 ml, membrane area 38 cm²). The retention capacity is defined as $$R = \frac{C_1 - C_2}{C_1} \cdot 100 [\%]$$

$C_1$ is the concentration of the aqueous test solution, $C_2$ is the concentration in the permeate.

A 2% strength aqueous polyvinylpyrrolidone solution (PVP) obtainable as "®Kollidon K30" from BASF (PVP K30) was employed as the test solution. The molecular weight of the polyvinylpyrrolidone was 49,000 Dalton. 1% strength solutions of fractionated dextrans having molecular weights of 10,000, 40,000 and 70,000 Dalton, obtainable under the name Dextran T10, Dextran T40 and Dextran T70 from Pharmacia, were furthermore used. 1% strength aqueous solutions of the salts NaCl and $Na_2SO_4$ were likewise employed as test solutions. The concentrations of the test solutions and of the permeates were determined by measuring the density of the aqueous solutions. The density measurements were carried out with a ®DA 210 density meter from Kyoto Electronics. A 0.15% strength solution of bovine albumin (BSA, Sigma A 6793) having a molecular weight of 69,000 Dalton in an $NA_2HPO_4/H_3PO_4$ buffer solution of pH=7.5 was also used as a test solution. The concentration of the albumin solutions was determined by UV spectrophotometry at a wavelength of 278 nm.

The hydraulic permeability of the membrane was found to be 500 l/m²h. The retention for PVP K30 was R=90%, that for Dex. T40 was R=42%, and for Dex. T10 R=17%. A sample of the membrane was charged with a solution of bovine albumin in an ultrafiltration experiment. The permeate flow under the abovementioned conditions was initially 220 l/m²h, and had fallen to a stationary value of 175 l/m²h after a filtration experiment duration of 1 hour. The retention capacity of the membrane for bovine albumin was determined as R≧99%.

Another sample of the membrane was placed in a bovine albumin sample solution at 20° C. for 24 hours. After this treatment, a hydraulic permeability of the membrane of 80 l/m²h was measured.

Comparison Example 2

The polyaramide solution prepared in Example 1 was used for the membrane described in this example, but without the addition of sulfonated polyether ketone. The polymer solution was likewise applied in a layer thickness of 200 μm to a polypropylene nonwoven carrier and coagulated in water at 20° C.

The hydraulic permeability was determined as 200 l/m²h under the conditions described in Example 1. The retention for PVP K30 was R=88%, that for Dex. T40 was R=45%, and for Dex. T10 R=12%. An ultrafiltration experiment with bovine albumin was carried out as in Example 1. The initial permeate flow was 190 l/m²h and the stationary permeate flow after an experiment duration of 1 hour was 150 l/m²h. The retention of the membrane for bovine albumin was R≧99%.

A sample of the membrane was placed in a bovine albumin sample solution at 20° C. for 24 hours. Thereafter, the hydraulic permeability had decreased to 120 l/m²h.

Example 3

A portion of the polymer alloy solution prepared in Example 1 was brushed on a polyphenylene sulfide nonwoven carrier and coagulated in water at 20° C. The membrane thus prepared was subjected to treatment at 100° C. in a mixture of 50 parts of water and 50 parts of NMP for 10 minutes. A hydraulic permeability of 100 l/m²h and a retention capacity for PVP K30 of R=99%, for Dex. T40 of R=98% and for Dex. T10 of R=97% were now determined by the process described in Example 1.

Two samples of the membrane were placed in acetone for the purpose of exchanging the pore liquid. The acetone-moist membranes were then kept at 20° C. in acetone or chloroform for 24 hours. Neither of the two membranes showed signs of destruction by the particular solvent in the form of severe swelling or pronounced shrinkage. The solvents were then replaced by acetone and again by water and the separation efficiency of the membranes was investigated again:

after treatment in chloroform: hydraulic permeability: 60 $1/m^2h$ retention capacity for Dex. T10: R=93% after treatment in acetone: hydraulic permeability: 100 $1/m^2h$ retention capacity for Dex. T10: R=95%

Comparison Example 4

A solution containing 30 g of a partly aromatic polyamide (®Trogamid T, Hüls AG) and 15 g of the sulfonated polyether ketone described in Example 1 in 155 g of NMP was prepared and homogenized, while stirring, for preparation of the membrane investigated in this example. The solution of this alloy was also brushed onto a polyphenylene sulfide nonwoven carrier and coagulated in water at 20° C. A hydraulic permeability of 220 $1/m^2h$ and a retention capacity for PVP K30 of R=92% were determined as described in Example 1. The pore liquid water was replaced by acetone and two samples of the membrane were kept in acetone and, respectively, chloroformat 20° C. for 24 hours. When the membrane samples were placed in these solvents, a change in the membrane morphology could already be observed.

The membranes were then reconditioned again on water. Characterization showed that the membranes were irreversibly damaged and had only a low retention capacity for PVP K30:

after treatment in chloroform: retention capacity for PVP K30:<10% after treatment in acetone: retention capacity for PVP K30:<20%

Example 5

To prepare the membrane investigated in this example, a copolyamide was obtained by polycondensation from (A') 100 mol % of terephthalic acid dichloride, (B') 35 mol % of paraphenylenediamine, (B") 35 mol % of metaphenylenediamine, (D') 30 mol % of 1,4-bis(4-aminophenoxy)benzene at T=70° C. in NMP as the solvent. The concentration of the solution was 15%. 7.5 g of the sulfonated polyether ketone described in Example 1 were added to 100 g of the polyaramide solution and the mixture was stirred until a clear, homogeneous solution was formed. The solution was brushed onto a polyethylene terephthalate nonwoven carrier and coagulated in water at 20° C. A hydraulic permeability of the membrane of 240 $1/m^2h$ and a retention capacity for PVP K30 of R=98%, for Dex. T40 of R=92% and for Dex. T10 of R=76% were measured by the process described in Example 1.

Comparison Example 6

A membrane was prepared from the polyaramide solution prepared in Example 5, but without addition of sulfonated polyether ketone, by brushing the solution onto a polyethylene terephthalate nonwoven carrier and then precipitating the membrane in water at 20° C. The following separation efficiency of the membrane resulted by the process from Example 1:

hydraulic permeability: 110 $1/m^2h$ retention capacity for PVP K30 R=97% for Dex. T40 R=94% for Dex. T10 R=84%

Example 7

To prepare the membrane investigated in this example, a copolyamide was obtained by polycondensation from (A') 100 mol% of terephthalic acid dichloride (B') 40 mol% of paraphenylenediamine (B") 20 mol % of metaphenylenediamine (D') 40 mol % of 1,4-bis(4-aminophenoxy)benzene at T=70° C. in NMP as the solvent. The concentration of the solution was c=12%. 6 g of the sulfonated polyether ketone described in Example 1 were added to 100 g of the polyaramide solution and the mixture was stirred until a clear homogeneous solution of the alloy was formed. The solution was brushed onto a polypropylene nonwoven carrier and coagulated in water at 20° C. A hydraulic permeability of 620 $1/m^2h$ and a quantitative ($\geq$99%) retention for bovine albumin (BSA) were measured according to Example 1. A sample of the membrane was kept under a bovine albumin sample solution at room temperature for 24 hours and then characterized again. A quantitative retention for BSA was found. The hydraulic permeability of the fouled membrane was 450 $1/m^2h$, i.e. 73% of the value of the native membrane.

Comparison Example 8

A membrane was prepared completely analogously from the polyaramide solution prepared in Example 6, but without the addition of sulfonated polyether ketone as an alloy component. A hydraulic permeability of 450 $1/m^2h$ was determined, and the retention of bovine albumin (BSA) was likewise quantitative. A sample of the membrane was kept under a bovine albumin sample solution at room temperature for 24 hours. Subsequent characterization showed a quantitative retention for BSA. The hydraulic permeability had decreased to 190 $1/m^2h$, i.e. 42% of the starting value of the native membrane.

Example 9

To prepare the membrane investigated in this example, a copolyamide was obtained by polycondensation from (A') 100 mol % of terephthalic acid dichloride (B') 50 mol % of paraphenylenediamine (D') 25 mol % of 3,4'-diaminodiphenylether (D") 25 mol % of 1,4-bis(4-aminophenoxy)benzene at T=70° C. in NMP as the solvent. The concentration of the solution was c=6%. 3 g of polyvinylpyrrolidone PVP K30 and 3 g of the sulfonated polyether ketone described in Example 1 were stirred in succession into 100 g of the polyaramide solution. A highly viscous but clear solution of the ternary polymer alloy was formed. The solution was brushed onto a polypropylene nonwoven carrier in a layer thickness of 250 µm and coagulated in water at 18° C. A hydraulic permeability of 1000 $1/m^2h$ was determined for this membrane by the method described in Example 1. The retention value for PVP K30 was R=80%. A sample of the membrane was treated in water at 97° C. for 10 minutes. The membrane now had a hydraulic permeability of 800 $1/m^2h$ and retained PVP to the extent of 91%.

Example 10

To prepare the membrane investigated in this example, a copolyamide was obtained by polycondensation from (A') 100 mol % of terephthalic acid dichloride (B') 50 mol % of paraphenylenediamine (B") 37.5 mol % of metaphenylenediamine (D') 12.5 mol % of 1,4-bis(4'-aminophenoxy)benzene at T=70° C. in NMP as the solvent. The concentration of the solution was c=10%. 5 g of the sulfonated polyether ketone described in Example 1 were stirred into 100 g of the solution. The highly viscous, clear solution was brushed onto a polypropylene nonwoven carrier in a layer thickness of 200 µm and the membrane was precipitated in water at 22° C. A hydraulic permeability of 130 $1/m^2h$ and a retention capacity for Dex. T10 of R=32%, for Dex. T40 of R=97% and for PVP K30 of R=97% were determined for this membrane in accordance with Example 1. The membrane showed no retention for low molecular weight test substances (MW <200 g/mol) in these experiments. A sample of the membrane was treated in a water:NMP (50:50) mixture at 96° C. for 10 minutes. In contrast to Example 1, it was now characterized under a pressure of p=15 bar. A hydraulic permeability of 105 1/m²h was determined. The retention capacity was R=26% for NaCl and R=82% for Na₂SO₄. The retention for Dex. T10 was quantitative (R≦99.5%).

We claim:

1. A semipermeable membrane of a homogeneously miscible polymer alloy which comprises at least one sulfonated, aromatic polyether ketone and at least one polyamide wherein said polyamide is a completely aromatic polyamide.

2. A membrane as claimed in claim 1, wherein the polymer alloy also comprises poly-N-vinyl-2-pyrrolidone.

3. A membrane as claimed in claim 2, wherein the polymer alloy also comprises a copolymer of N-vinyl-2-pyrrolidone and vinyl acetate.

4. A membrane as claimed in claim 3, wherein the polymer alloy comprises 5 to 60% by weight of at least one sulfonated, aromatic polyether ketone and 30 to 90% by weight of at least one completely aromatic polyamide.

5. A membrane as claimed in claim 4, wherein the polymer alloy comprises 15 to 50% by weight of at least one sulfonated, aromatic polyether ketone and 40 to 75% by weight of at least one completely aromatic polyamide.

6. A membrane as claimed in claim 2, wherein the polymer alloy comprises 5 to 60% by weight of at least one sulfonated, aromatic polyether ketone and 30 to 90% by weight of at least one completely aromatic polyamide.

7. A membrane as claimed in claim 6, wherein the polymer alloy comprises 0.1 to 30% by weight of poly-N-vinyl-2-pyrrolidone, 0.1 to 30% by weight of at least one copolymer of N-vinyl-2-pyrrolidone or mixtures thereof and vinyl acetate.

8. A membrane as claimed in claim 6, wherein the polymer alloy comprises 15 to 50% by weight of at least one sulfonated, aromatic polyether ketone and 40 to 75% by weight of least one completely aromatic polyamide.

9. A membrane as claimed in claim 2, wherein the molecular weight of the polyvinylpyrrolidone is in the range from 1000 to 3 million.

10. A membrane as claimed in claim 9, wherein the molecular weight of the polyvinylpyrrolidone is in the range from 20,000 to 200,000.

11. A membrane as claimed in claim 9, wherein the molecular weight of the polyvinylpyrrolidone is in the range from 40,000 to 100,000.

12. A membrane as claimed in claim 1, wherein the polymer alloy also comprises a copolymer of N-vinyl-2-pyrrolidone and vinyl acetate.

13. A membrane as claimed in claim 12, wherein the polymer alloy comprises 5 to 60% by weight of at least one sulfonated, aromatic polyether ketone and 30 to 90% by weight of at least one completely aromatic polyamide.

14. A membrane as claimed in claim 13, wherein the polymer alloy comprises 15 to 50% by weight of at least one sulfonated, aromatic polyether ketone and 40 to 75% by weight of at least one completely aromatic polyamide.

15. A membrane as claimed in claim 1, wherein the polymer alloy comprises 1 to 99% by weight of at least one sulfonated, aromatic polyether ketone and 1 to 99% by weight of a completely aromatic polyamide.

16. A membrane as claimed in claim 1, wherein the sulfonated, aromatic polyether ketone has a molecular weight which is in the range from 10,000 to 60,000 g/mol.

17. A membrane as claimed in claim 1, wherein the polymer alloy comprises at least one completely aromatic copolyamide which contains structural units of the formula —HN—Ar²—Z¹—Ar³—(—Z²—Ar³—Z³—Ar²—)ₙ—NH—OC—Ar¹—CO— in which:

— Ar¹— is a 1,4-phenylene radical or another divalent ($C_6$–$C_{12}$)-aromatic or -heteroaromatic radical optionally containing sulfonic acid groups or ether bridges, which is optionally substituted by one or two branched or unbranched $C_1$–$C_4$-alkyl or -alkoxy radicals or by one or more halogen atoms, —Ar²— and —Ar³— are identical or different 1,2-phenylene, 1,3-phenylene or 1,4-phenylene radicals, which are optionally substituted by one or two branched or unbranched $C_1$–$C_4$-alkyl or -alkoxy radicals or by one or more halogen atoms, —Z¹—, —Z²— and —Z³— independently of one another are a direct bond or one of the following divalent radicals: —O—, —C(CH₃)₂—, —C(CF₃)₂—, —SO₂— or —O—Ar₂—O—, and —Ar²— has the above-mentioned meaning, and n is an integer.

18. A membrane as claimed in claim 17, wherein the polymer alloy contains at least one completely aromatic copolyamide with the structural unit (A) —OC—Ar¹—CO— and three different structural units of the formulae (B) —NH—Ar²—NH— and (C) —NH—Ar²—Z¹—Ar³—NH— wherein at least one structural unit B and D is present and Ar² in B and D can be the same or different.

19. A membrane as claimed in claim 18, wherein —Ar¹— in the structural units A is selected from the group consisting of

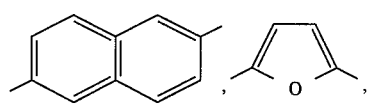, 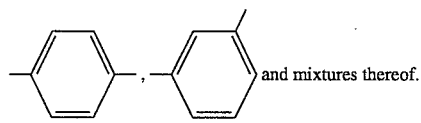 and mixtures thereof.

20. A membrane as claimed in claim 18, wherein, in the structural units D of the completely aromatic copolyamide, the radical —Ar²—Z—Ar³— is chosen from

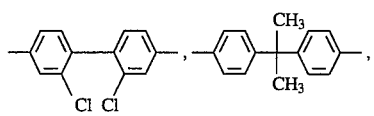

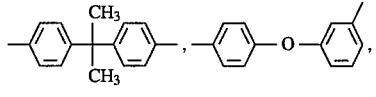

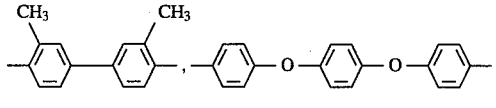

and

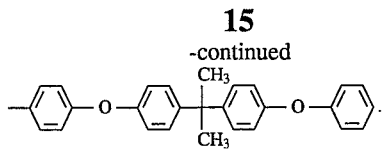

21. A membrane as claimed in claim 18, wherein, in the completely aromatic copoly&mide, the structural units A, B and D are present in the molar ratios of B/A=0.3–0.9, D/A=0.1–0.7 and (B+D)/A=0.9 to 1.1.

22. A membrane as claimed in claim 17, wherein the intrinsic viscosity of at least one copolyamide used as an alloy component is between 50 and 1000 cm³/g, determined in 96% strength sulfuric acid at 25° C.

23. A membrane as claimed in claim 1, which is located on a layer of nonwoven plastic or of paper, which is permeable to media which are capable of flow.

24. A membrane as claimed in claim 1, which is a hollow fiber membrane.

25. A process for modifying the retention capacity of a membrane as claimed in claim 1, which comprises subjecting the membrane to heat treatment in a liquid.

26. The process as claimed in claim 25, wherein the liquid is selected from the group water, a mono- or polyhydric alcohol, an aprotic solvent of the amide type and mixtures thereof and the heat treatment is carried out at temperatures in the range from 60° to 140° C.

27. The process for the preparation of a membrane as claimed in claim 1, which comprises spreading a polymer solution comprising at least one sulfonated, aromatic polyether ketone and at least one polyaramide or at least one sulfonated, aromatic polyether ketone, at least one polyaramide and polyvinylpyrrolidone CoPVPAc or mixtures thereof, and an aprotic, organic solvent as a liquid layer onto a flat substrate, immersing this in an excess of a precipitating liquid which is miscible with the solvent but in which the polymer contents dissolved in the polymer solution are not soluble, so that a precipitated membrane forms, and separating off the membrane from the liquid phase and washing it with fresh precipitating liquid.

28. The process as claimed in claim 27, wherein a liquid selected from the group consisting of water, a mono- or polyhydric alcohol or a mixture thereof is employed, optionally with an aprotic, polar solvent, as the precipitating liquid.

29. The process as claimed in claim 28, wherein the alcohol is selected from the group consisting of methanol, ethanol, isopropanol, ethylene glycol and glycerol and the aprotic polar solvent is selected from the group consisting of N,N-dimethylformamide, N,N-dimethyl diacetamide, dimethyl sulfoxide and N-methyl-2-pyrrolidone.

30. The process as claimed in claim 27, wherein the washed membrane is dried.

31. The process as claimed in claim 27, wherein, before drying, the washed membrane is impregnated with a plasticizer which is miscible with the precipitating liquid and wets the membrane.

32. The process as claimed in claim 31, wherein the membrane impregnated with the plasticizer is dried at a temperature in the range from 30° to 80° C.

33. The process as claimed in claims 31, wherein glycerol is used as the plasticizer.

34. A membrane as claimed in claim 1, wherein the polymer alloy comprises at least one sulfonated, aromatic polyether ketone of the formula I

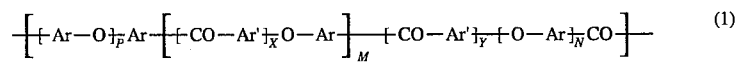

in which
— Ar— is a phenylene ring with para bonds, meta bonds, or both para and meta bonds,
— Ar' is a phenyelene, naphthylene, biphenylene or anthrylene unit or a divalent aromatic unit,
X, M and N independently of one another are zero or 1,
Y is zero, 1, 2 or 3, and
p is 1, 2, 3 or 4,
and in which said at least one sulfonated, aromatic polyether ketone comprises O-phenylene-O units and at least 20% of the O-phenylene-O units are substituted by an SO₃H group.

35. A membrane as claimed in claim 1, wherein the polymer alloy comprises at least one sulfonated, aromatic polyether ketone of formula II

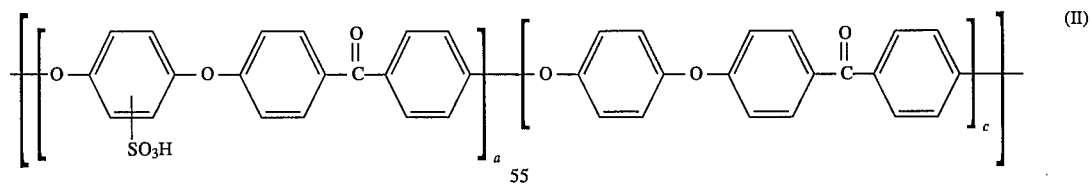

in which a is a number from 0.2 to 1, c is a number from 0 to 0.8 and the sum of a+c=1;
of formula III

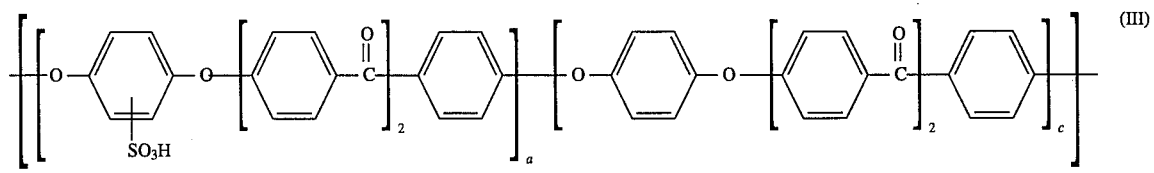

in which a is a number from 0.2 to 1, c is a number from 0 to 0.8 and the sum of a+c=1; or of formula IV

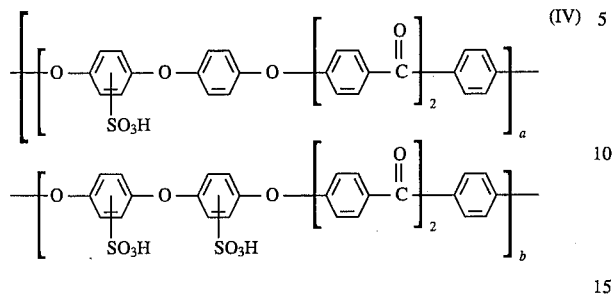

(IV)

in which a is a number from 0 to 1, b is a number from 0 to 1, c is a number from 0 to 0.5 and the sum of a+b+c.=1.

36. A membrane as claimed in claim 1, wherein a sulfonated copolymer which is built up from at least two different recurring units of the formulae II, III and IV is employed for the sulfonated, aromatic polyether ketone and formula II is:

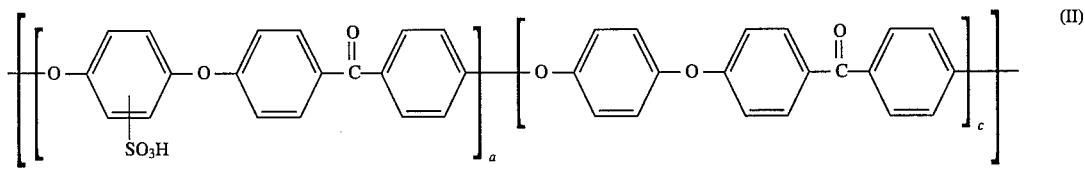

(II)

in which a is a number from 0.2 to 1, c is a number from 0 to 0.8 and the sum of a+c=1: formula III is:

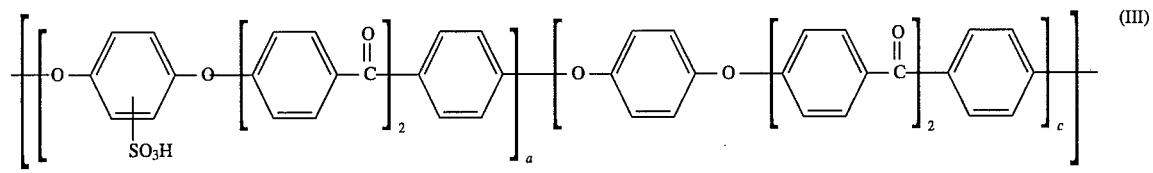

(III)

in which a is a number from 0.2 to 1, c is a number from 0 to 0.8 and the sum of a+c =1; and formula IV is:

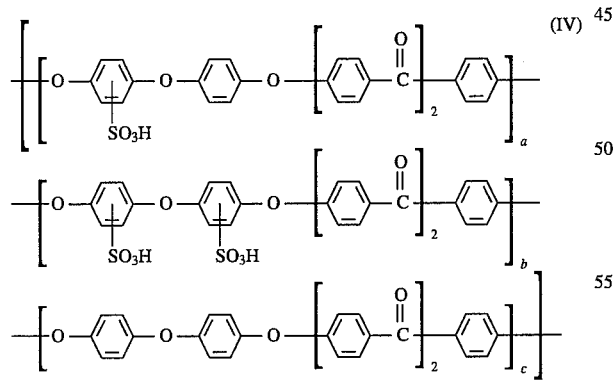

(IV)

in which a is a number from 0 to 1, b is a from 0 to 1, c is a number from 0 to 0.5 end the sum of a+b+c=1.

* * * * *

UNITED STATES PATENT AND TRADEMARK OFFICE
CERTIFICATE OF CORRECTION

PATENT NO. : 5,505,851
DATED : April 9, 1996
INVENTOR(S) : Wagener et al.

It is certified that error appears in the above-indentified patent and that said Letters Patent is hereby corrected as shown below:

Claim 18, column 14, line 31, please change "(C)" to --(D)--;

Claim 21, column 15, line 7, please change "copoly&mide" to --copolyamide--;

Signed and Sealed this

Eighteenth Day of February, 1997

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,505,851
DATED      : April 9, 1996
INVENTOR(S) : Wagener et al.

It is certified that error appears in the above-indentified patent and that said Letters Patent is hereby corrected as shown below:

Claim 35, column 17, between lines 14 and 16, after chemical formula

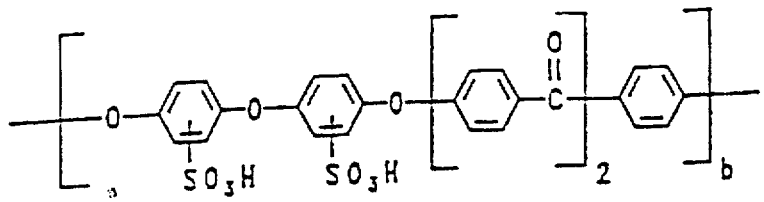

, please insert--

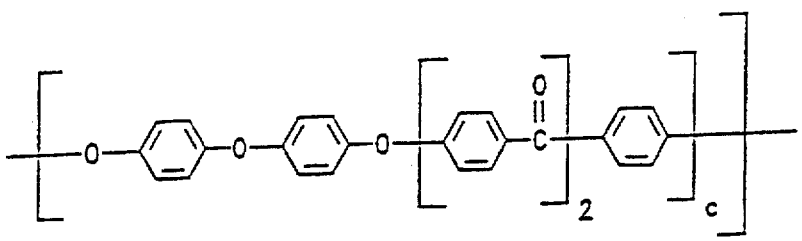

--.

Signed and Sealed this

Twenty-second Day of July, 1997

Attest:

BRUCE LEHMAN

Attesting Officer

Commissioner of Patents and Trademarks